(12) United States Patent
Hsu

(10) Patent No.: US 9,823,162 B2
(45) Date of Patent: Nov. 21, 2017

(54) LENS FOCUSING DEVICE AND REPLACEABLE CHART DISPLAY MODULE THEREOF

(71) Applicants: LITE-ON ELECTRONICS (GUANGZHOU) LIMITED, Guangzhou (CN); LITE-ON TECHNOLOGY CORPORATION, Taipei (TW)

(72) Inventor: Wen-Liang Hsu, Hsinchu County (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 15/159,471

(22) Filed: May 19, 2016

(65) Prior Publication Data

US 2017/0261401 A1 Sep. 14, 2017

(30) Foreign Application Priority Data

Mar. 9, 2016 (CN) .......................... 2016 1 0133675

(51) Int. Cl.
*G01B 9/00* (2006.01)
*G01M 11/02* (2006.01)
*G02B 13/02* (2006.01)
*G02B 7/02* (2006.01)

(52) U.S. Cl.
CPC .... *G01M 11/0214* (2013.01); *G01M 11/0264* (2013.01); *G02B 7/023* (2013.01); *G02B 13/02* (2013.01)

(58) Field of Classification Search
CPC .......... G01M 11/0214; G01M 11/0264; G02B 7/023; G02B 13/02
USPC .................................................. 356/124–127
See application file for complete search history.

(56) References Cited

U.S. PATENT DOCUMENTS

2015/0042867 A1* 2/2015 Shiono .................. G03B 13/32
348/348

* cited by examiner

Primary Examiner — Tri T Ton
(74) Attorney, Agent, or Firm — Li & Cai Intellectual Property (USA) Office

(57) ABSTRACT

A lens focusing device includes a lens holding module for clamping at least one test lens to be tested, a replaceable chart display module, and a focal length shortening module. The replaceable chart display module includes a frame structure, a first chart display element detachably disposed on the frame structure, and a plurality of second chart display elements detachably disposed on the frame structure, and each second chart display element is inclined at a predetermined angle relative to the first chart display element. The focal length shortening module includes a first focal length shortening structure and a plurality of second focal length shortening structures. The first focal length shortening structure is disposed between the at least one test lens and the first chart display element, and each second focal length shortening structure is disposed between the at least one test lens and the corresponding second chart display element.

16 Claims, 8 Drawing Sheets

LENS FOCUSING DEVICE AND REPLACEABLE CHART DISPLAY MODULE THEREOF

BACKGROUND OF THE INVENTION

1. Field of the Invention

The instant disclosure relates to a focusing device and a chart display module thereof, and more particularly to a lens focusing device and a replaceable chart display module thereof.

2. Description of Related Art

A conventional manual focusing and measuring machine generally includes a manual focusing apparatus for adjusting an optical lens to focus on an object so as to obtain clear images of the object. The manual focusing and measuring machine has advantages of lower-cost and simpler structure, but without stability and reliability. The manual focusing process needs to rely on sight, so different users may have different perceptions of the same image of the same object. As a result, different users may have to focus on the same object repeatedly in order to obtain clear images. Moreover, a sharpness degree of the clear images will directly affect the precision of the measurement of the object during the manual focusing process.

Hence, the prior art provides an image focusing system having a plurality of curve charts for indicating sharpness of images of the object during the manual focusing process, so as to improve the focusing precision of the manual focusing and measuring machine, and avoid different users having to focus the object repeatedly. However, the curve charts provided by the prior image focusing system are fixed and irreplaceable.

SUMMARY OF THE INVENTION

One aspect of the instant disclosure relates to a lens focusing device and a replaceable chart display module thereof.

One of the embodiments of the instant disclosure provides a lens focusing device, comprising: a lens holding module for clamping at least one test lens to be tested, a replaceable chart display module, and a focal length shortening module. The replaceable chart display module includes a frame structure, a first chart display element detachably disposed on the frame structure, and a plurality of second chart display elements detachably disposed on the frame structure, and each second chart display element is inclined at a predetermined angle relative to the first chart display element. The focal length shortening module includes a first focal length shortening structure and a plurality of second focal length shortening structures. The first focal length shortening structure is disposed between the at least one test lens and the first chart display element, and each second focal length shortening structure is disposed between the at least one test lens and the corresponding second chart display element.

Another one of the embodiments of the instant disclosure provides a replaceable chart display module, comprising: a frame structure, a first chart display element, and a plurality of second chart display elements. The first chart display element is detachably disposed on the frame structure. The second chart display elements are detachably disposed on the frame structure, wherein each second chart display element is inclined at a predetermined angle relative to the first chart display element.

Therefore, the first chart display element and the second chart display elements are replaceable charts due to the designs of "the first chart display element is detachably disposed on the frame structure" and "the second chart display elements are detachably disposed on the frame structure", so that it is very convenient for a user to quickly replace charts to focus the at least one test lens.

Furthermore, the distance between the first chart display element and the at least one test lens can be shortened in the lens focusing device and the distance between the second chart display element and the at least one test lens can be shortened in the lens focusing device by matching the first focal length shortening structure and the second focal length shortening structure due to the designs of "the first focal length shortening structure is disposed between the at least one test lens and the first chart display element" and "each second focal length shortening structure is disposed between the at least one test lens and the corresponding second chart display element", so that the whole height of the lens focusing device can be reduced due to the usage of the first focal length shortening structure and the second focal length shortening structure.

To further understand the techniques, means and effects of the instant disclosure applied for achieving the prescribed objectives, the following detailed descriptions and appended drawings are hereby referred to, such that, and through which, the purposes, features and aspects of the instant disclosure can be thoroughly and concretely appreciated. However, the appended drawings are provided solely for reference and illustration, without any intention to limit the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DETAILED DESCRIPTION OF THE PREFERRED EMBODIMENTS

The embodiments of a lens focusing device and a replaceable chart display module thereof of the instant disclosure are described. Other advantages and objectives of the instant disclosure can be easily understood by one skilled in the art from the disclosure. The instant disclosure can be applied in different embodiments. Various modifications and variations can be made to various details in the description for different applications without departing from the scope of the instant disclosure. The drawings of the instant disclosure are provided only for simple illustrations, but are not drawn to scale and do not reflect the actual relative dimensions. The following embodiments are provided to describe in detail the concept of the instant disclosure, and are not intended to limit the scope thereof in any way.

Referring to FIG. 1 to FIG. 6, the instant disclosure provides a lens focusing device Z, comprising a lens holding module 1, a replaceable chart display module 2 and a focal length shortening module 3.

Figure 1:
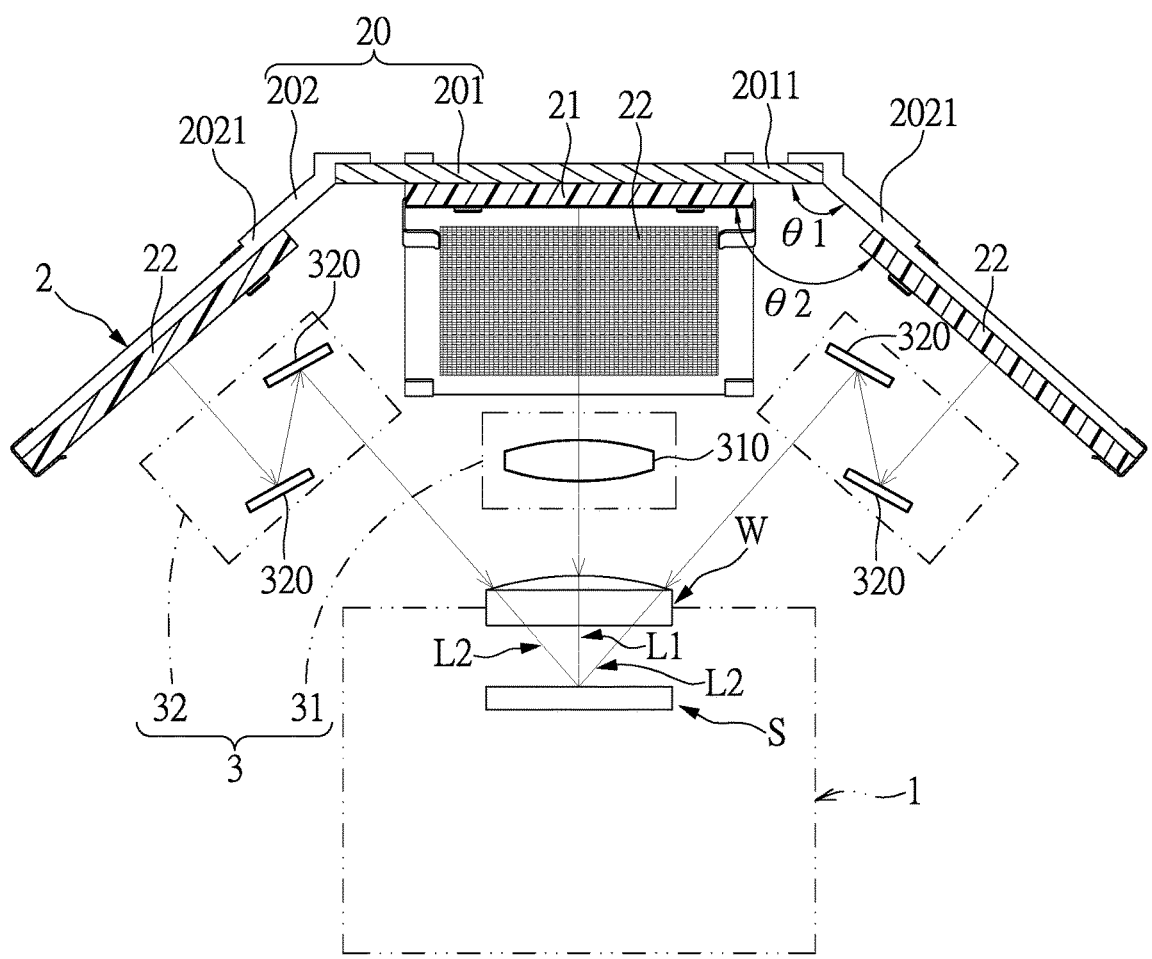
FIG. 1 shows a lateral, cross-sectional, schematic view of the lens focusing device according to the instant disclosure.
Figure 2:
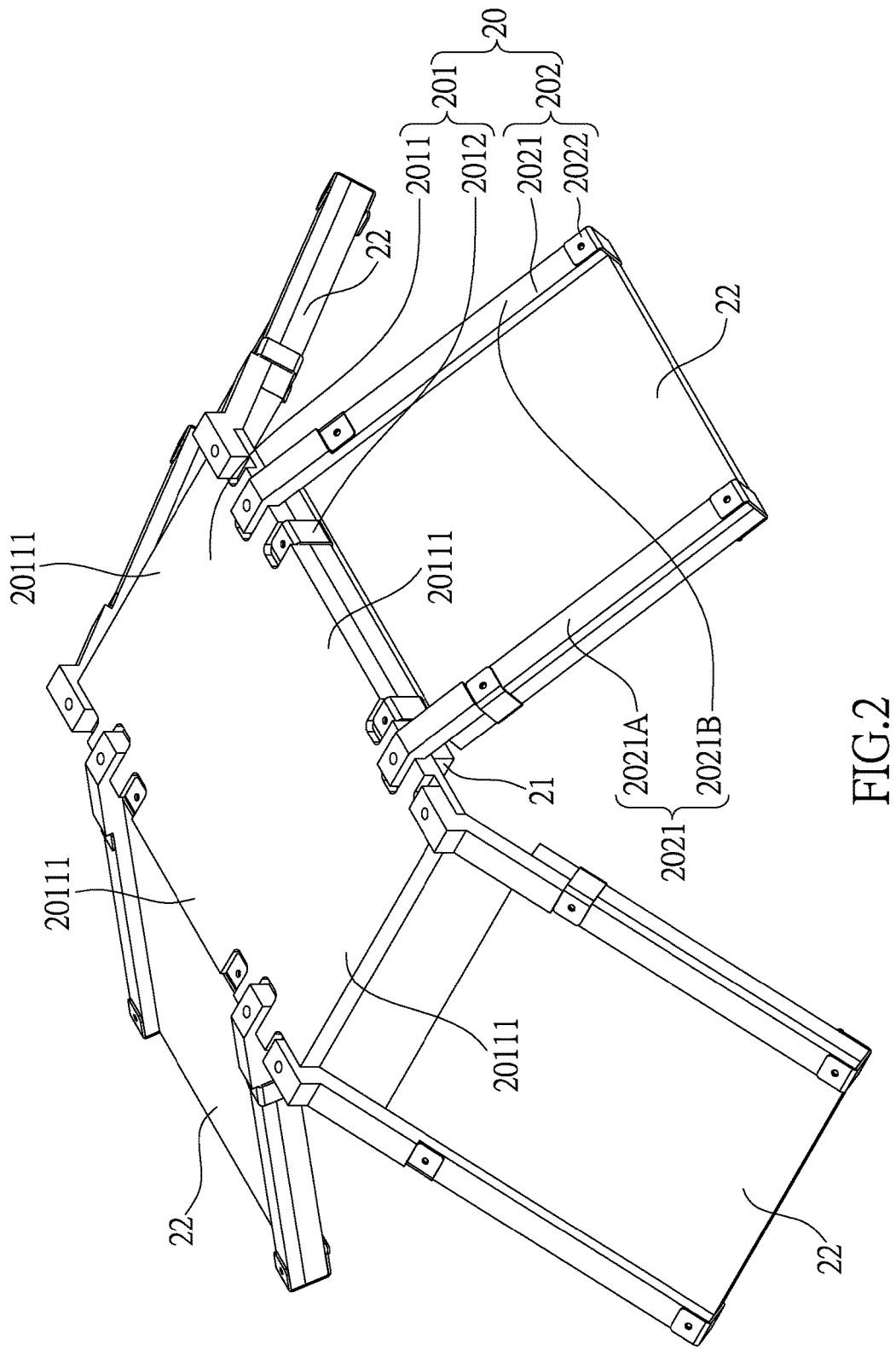
FIG. 2 shows a perspective, schematic view of the replaceable chart display module of the lens focusing device according to the instant disclosure.

First, referring to FIG. 1 and FIG. 2, the lens holding module 1 can be used for clamping at least one test lens W to be tested. For example, the at least one test lens W may be a non wide angle lens, a wide angle lens or an extra wide angle lens. In addition, the lens holding module 1 may be a six-axis optical adjustment mechanism with a six-axis direction adjustment function including an X-axis direction adjustment, a Y-axis direction adjustment, a Z-axis direction adjustment, a spin angle adjustment, a front and rear deflection angle adjustment, and a left and right deflection angle adjustment etc., but it is merely an example and is not meant to limit the instant disclosure.

Figure 3:
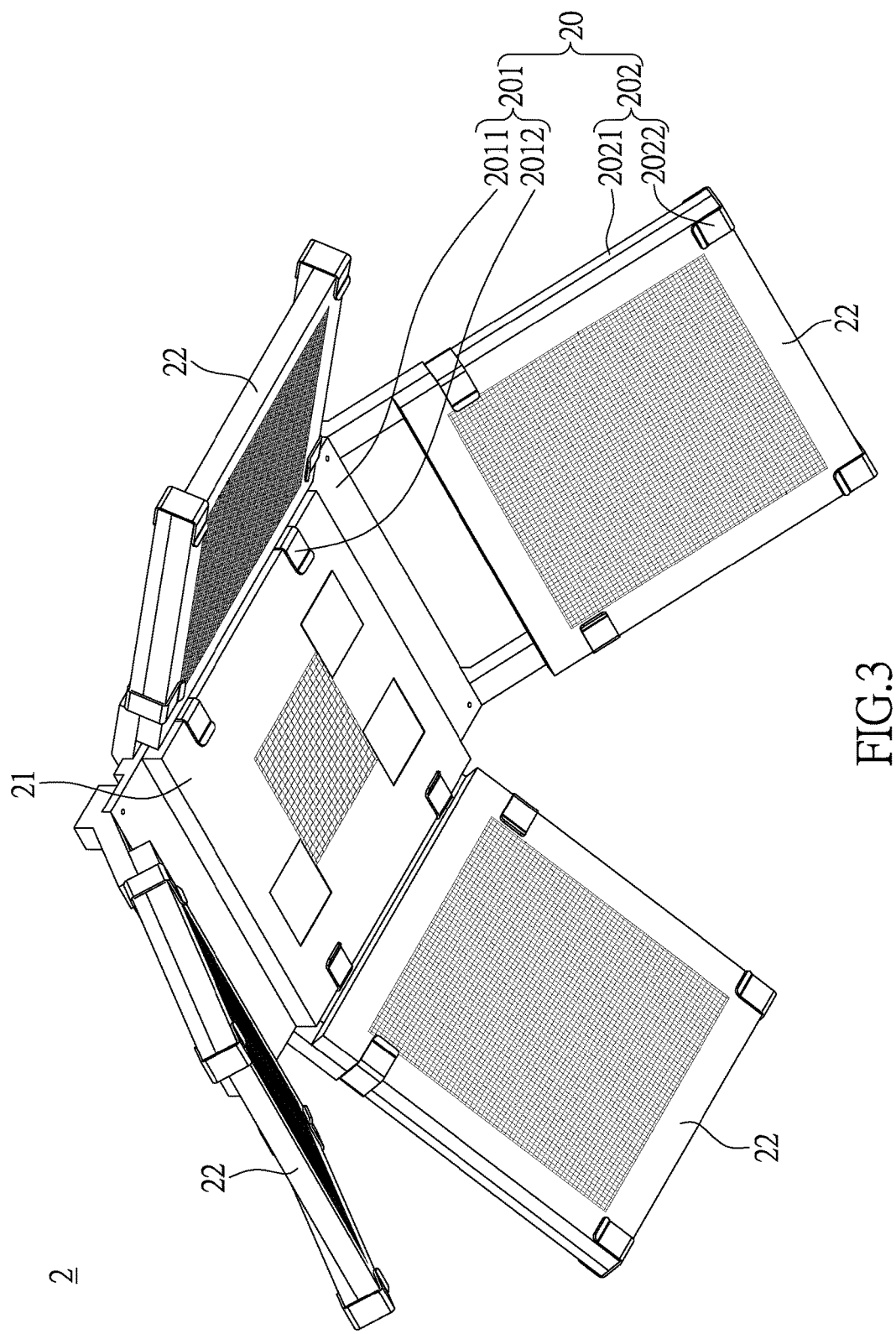
FIG. 3 shows another perspective, schematic view of the replaceable chart display module of the lens focusing device according to the instant disclosure.

Moreover, referring to FIG. 2 and FIG. 3, the replaceable chart display module 2 includes a frame structure 20, a first chart display element 21 detachably disposed on the frame structure 20, and a plurality of second chart display elements 22 detachably disposed on the frame structure 20. Therefore, the first chart display element 21 and the second chart display elements 22 are replaceable charts, so that it is very convenient for a user to quickly replace charts to focus the at least one test lens W. It is worth mentioning that the first chart display element 21 and the second chart display element 22 can be replaced at the same time.

Figure 4:
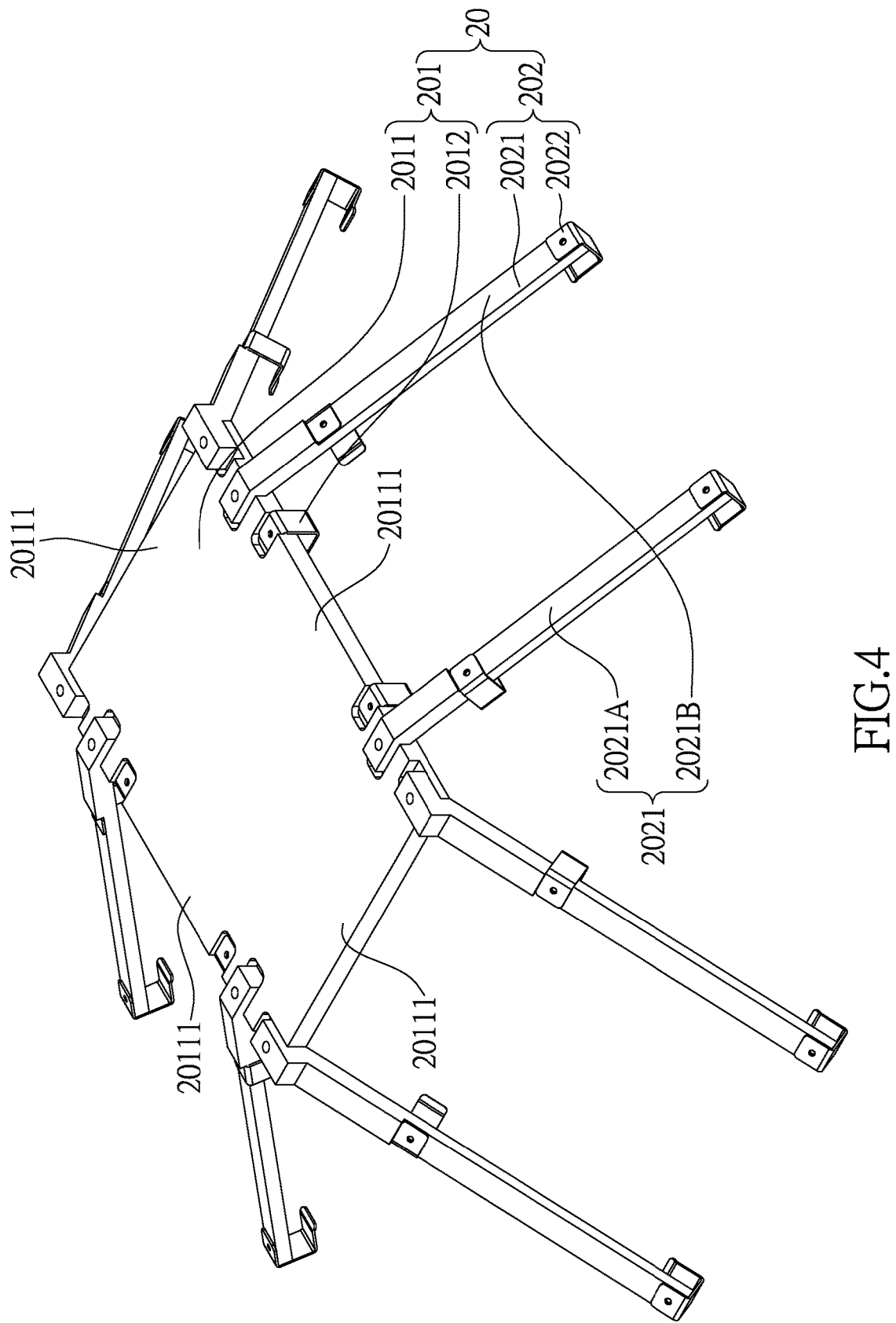
FIG. 4 shows a perspective, schematic view of the frame structure of the replaceable chart display module of the lens focusing device according to the instant disclosure.

More precisely, referring to FIG. 2, FIG. 3 and FIG. 4, the frame structure 20 includes a first frame 201 and a plurality of second frames 202 fixedly or adjustably disposed on the first frame 201. Please note, the instant disclosure using the plurality of second frames 202 fixedly or adjustably disposed on the first frame 201 is an example shown in FIG. 1 to FIG. 6, but it is not meant to limit the instant disclosure. For example, the instant disclosure can provide a pivot structure pivotally disposed between the first frame 201 and the second frame 202, that is to say, the second frame 202 can pivot on the first frame 201, so that it is very convenient for a user to adjust the inclined angle of the second frame 202 relative to the first frame 201 according to different requirements.

Following the above description, referring to FIG. 2, FIG. 3 and FIG. 4, the first frame 201 includes a first frame body 2011 and a plurality of first clamping elements 2012 disposed on the first frame body 2011, and each second frame 202 includes a second frame body 2021 fixedly (or adjustably) disposed on the first frame body 2011 and a plurality of second clamping elements 2022 disposed on the second frame body 2021. More precisely, the first frame body 2011 has a plurality of lateral side portions 20111, and the second frame bodies 2021 respectively fixedly (or adjustably) disposed on the lateral side portions 20111 of the first frame body 2011. In addition, as shown in FIG. 1, each second frame body 2021 can be inclined at a predetermined angle $\theta 1$ relative to the first frame body 2011 according to different requirements, so that each second chart display element 22 can be also inclined at a predetermined angle $\theta 2$ relative to the first chart display element 21. That is to say, the predetermined inclined angle $\theta 2$ of the second chart display element 22 relative to the first chart display element 21 can be determined according to the predetermined inclined angle $\theta 1$ of the second frame body 2021 relative to the first frame body 2011.

Therefore, the first chart display element 21 can be positioned on the first frame body 2011 by clamping of the first clamping elements 2012 of the first frame 201, and each second chart display element 22 can be positioned on the corresponding second frame body 2021 by clamping of the second clamping elements 2022 of the corresponding second frame 202.

For example, as shown in FIG. 2 or FIG. 4, each second frame body 2021 includes at least two extending arms (2021A, 2021B) fixedly (or adjustably) disposed on the first frame body 2011, and each second chart display element 22 can be positioned between the at least two extending arms (2021A, 2021B) of the corresponding second frame body 2021 by clamping of the second clamping elements 2022 of the corresponding second frame 202. However, the above-mentioned design for the second frame body 2021 with the at least two extending arms (2021A, 2021B) is merely an example and is not meant to limit the instant disclosure.

Figure 5:
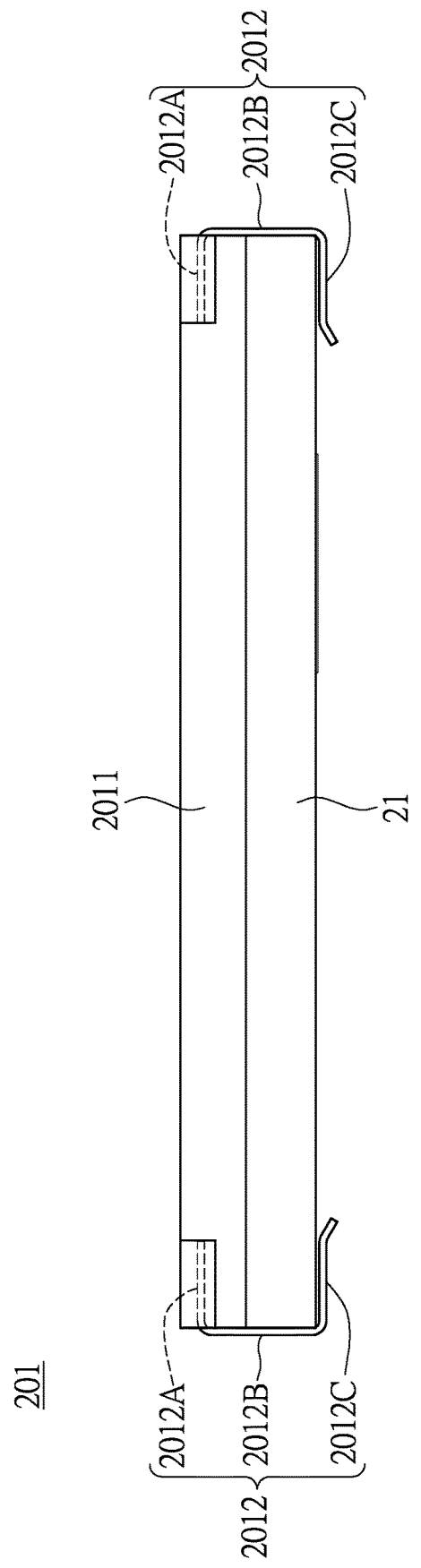
FIG. 5 shows a lateral, schematic view of the first frame of the frame structure of the replaceable chart display module of the lens focusing device according to the instant disclosure.

For example, referring to FIG. 4 and FIG. 5, the first clamping element 2012 of the first frame 201 has a first fixing portion 2012A fixed on the first frame body 2011, a first position limiting portion 2012B extended outwardly from the first fixing portion 2012A to limit (or restrict) the position of the first chart display element 21, and a first pressing portion 2012C connected to the first position limiting portion 2012B to abut against (or press) the first chart display element 21. That is to say, the positioning effect of the first chart display element 21 can be increased by matching the first position limiting portion 2012B and the first pressing portion 2012C. However, the above-mentioned design for the first clamping element 2012 with the first fixing portion 2012A, the first position limiting portion 2012B and the first pressing portion 2012C is merely an example and is not meant to limit the instant disclosure.

Figure 6:
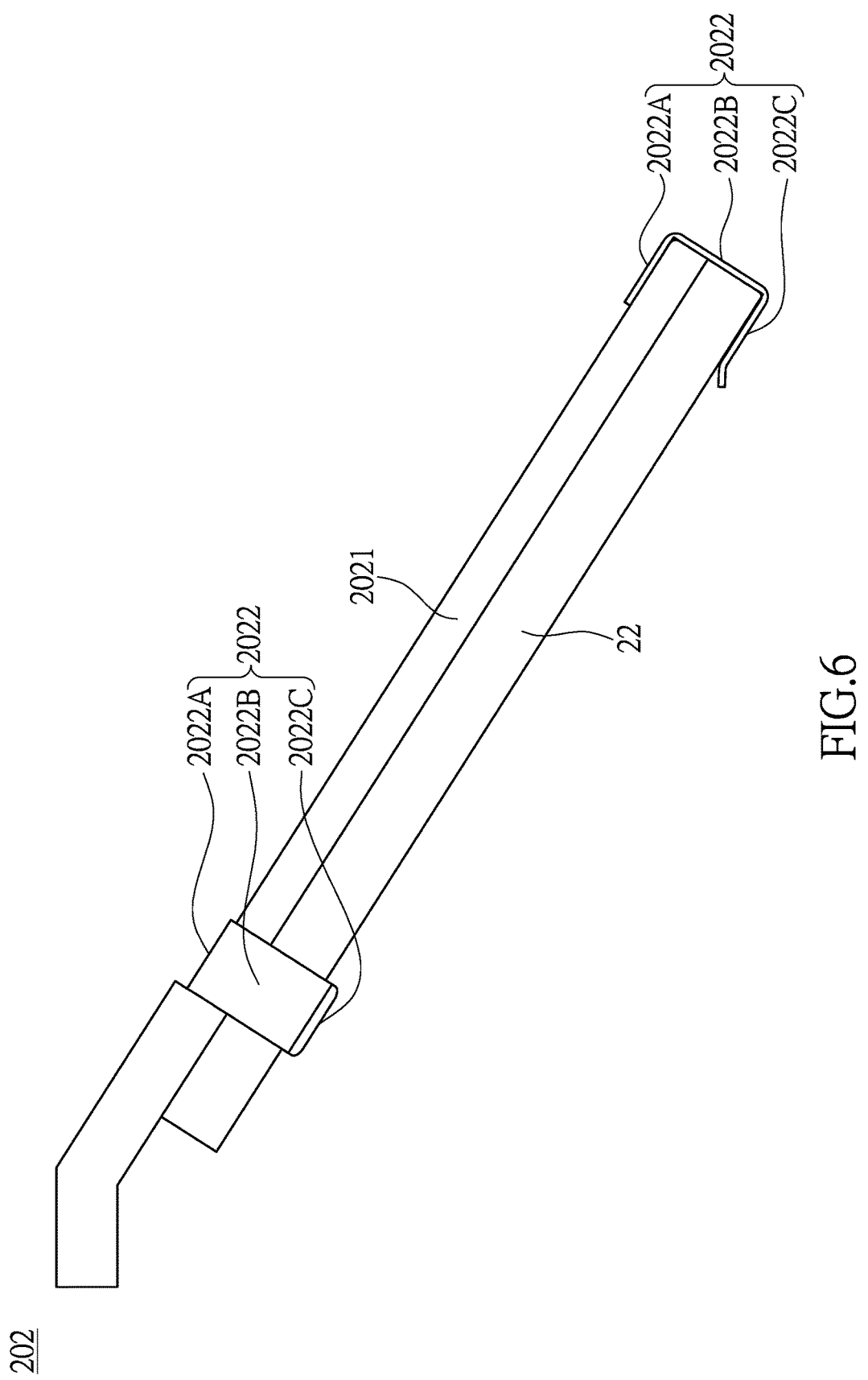
FIG. 6 shows a lateral, schematic view of the second frame of the frame structure of the replaceable chart display module of the lens focusing device according to the instant disclosure.

For example, referring to FIG. 4 and FIG. 6, the second clamping element 2022 of the second frame 202 has a second fixing portion 2022A fixed on the second frame body 2021, a second position limiting portion 2022B extended outwardly from the second fixing portion 2022A to limit (or restrict) the position of the second chart display element 22, and a second pressing portion 2022C connected to the second position limiting portion 2022B to abut against (or press) the second chart display element 22. That is to say, the positioning effect of the second chart display element 22 can be increased by matching the second position limiting portion 2022B and the second pressing portion 2022C. However, the above-mentioned design for the second clamping element 2022 with the second fixing portion 2022A, the second position limiting portion 2022B and the second pressing portion 2022C is merely an example and is not meant to limit the instant disclosure.

Furthermore, as shown in FIG. 1, the focal length shortening module 3 includes a first focal length shortening structure 31 and a plurality of second focal length shortening structures 32. The first focal length shortening structure 31 is disposed between the at least one test lens W and the first chart display element 21, and each second focal length shortening structure 32 is disposed between the at least one test lens W and the corresponding second chart display element 22. For example, the first focal length shortening structure 31 includes at least one telephoto lens 310, and each second focal length shortening structure 32 includes at least two reflecting mirrors 320. However, the above-mentioned design for the first focal length shortening structure 31 and the second focal length shortening structure 32 is merely an example and is not meant to limit the instant disclosure.

Following the above description, a first chart image generated by the first chart display element 21 can sequentially pass through the at least one telephoto lens 310 and the at least one test lens W to form a first image light beam L1 that is projected onto an image sensing element S. In addition, a second chart image generated by the second chart display element 22 can be sequentially reflected by the at least two reflecting mirrors 320 in advance and then pass through the at least one test lens W to form a second image light beam L2 that is projected onto the same image sensing element S. Therefore, the lens focusing device Z can focus at least one test lens W due to the first image light beam L1 and the second image light beam L2 captured by the image sensing element S.

Please note, the distance between the first chart display element 21 and the at least one test lens W can be shortened in the lens focusing device Z due to usage of the first focal length shortening structure 31, and the distance between the second chart display element 22 and the at least one test lens W can be shortened in the lens focusing device Z due to usage of the second focal length shortening structure 32. That is to say, the whole height of the lens focusing device Z can be reduced due to the usage of the first focal length shortening structure 31 and the second focal length shortening structure 32.

Figure 7:
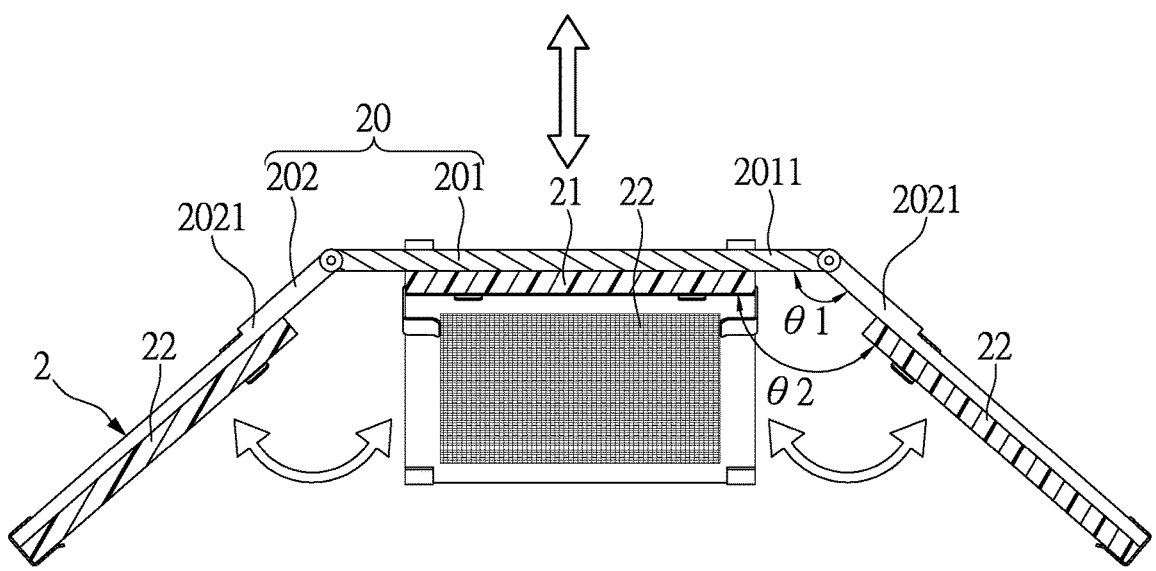
FIG. 7 shows a lateral, cross-sectional, schematic view of the lens focusing device using another type of replaceable chart display module according to the instant disclosure.

Referring to FIG. 7, the second frames 202 of the frame structure 20 can be pivotally disposed on the first frame 201. Therefore, referring to the angle adjustment arrows as shown in FIG. 7, when the inclined angle θ1 of the second frame body 2021 relative to the first frame body 2011 is adjusted, the inclined angle θ2 of the second chart display element 22 relative to the first chart display element 21 is adjusted following the adjustment of the inclined angle θ1 of the second frame body 2021. That is to say, according to different requirements, the predetermined inclined angle θ2 of the second chart display element 22 relative to the first chart display element 21 can be determined according to the predetermined inclined angle θ1 of the second frame body 2021 relative to the first frame body 2011. Please note, referring to the raising and lowering adjustment arrow as shown in FIG. 7, because the frame structure 20 can be moved upwardly or downwardly, the height positions of the first chart display element 21 and the second chart display element 22 can be adjusted following the raising and lowering adjustment of the frame structure 20.

Figure 8:
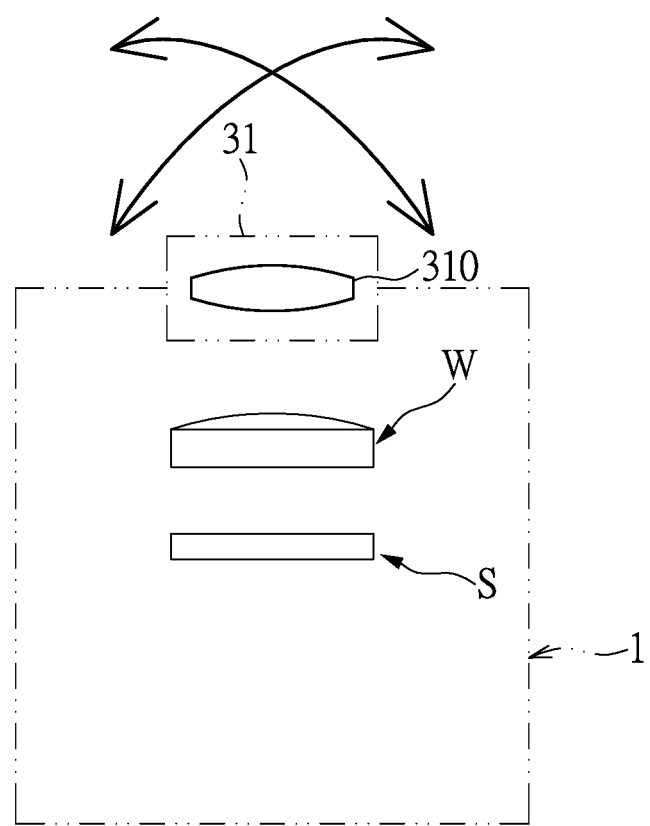
FIG. 8 shows a schematic view of both the first focal length shortening structure and the test lens concurrently clamped on the lens holding module according to the instant disclosure.

Referring to FIG. 8, the first focal length shortening structure 31 of the lens focusing device Z can be directly disposed on the lens holding module 1, so that both the at least one test lens W and the at least one telephoto lens 310 of the first focal length shortening structure 31 can be concurrently clamped on the lens holding module 1. Hence, both the at least one test lens W and the at least one telephoto lens 310 can be concurrently adjusted following the lens holding module 1. In other words, in another example, the at least one telephoto lens 310 can be used as a glass that is placed in front of the at least one test lens W, so that the at least one telephoto lens can be swung following the at least one test lens W for scanning the first chart display element 21 and the second chart display elements 22 (i.e., scanning five areas on five charts, respectively). Therefore, the optical path of the lens focusing device Z can be shortened, and the at least one test lens W can be tested by the lens focusing device Z to obtain a finished lens product at infinity.

In conclusion, the first chart display element 21 and the second chart display elements 22 are replaceable charts due to the designs of "the first chart display element 21 is detachably disposed on the frame structure 20" and "the second chart display elements 22 are detachably disposed on the frame structure 20", so that it is very convenient for a user to quickly replace charts to focus the at least one test lens W.

Furthermore, the distance between the first chart display element 21 and the at least one test lens W can be shortened in the lens focusing device Z and the distance between the second chart display element 22 and the at least one test lens W can be shortened in the lens focusing device Z by matching the first focal length shortening structure 31 and the second focal length shortening structure 32 due to the designs of "the first focal length shortening structure 31 is disposed between the at least one test lens W and the first chart display element 21" and "each second focal length shortening structure 32 is disposed between the at least one test lens W and the corresponding second chart display element 22", so that the whole height of the lens focusing device Z can be reduced due to the usage of the first focal length shortening structure 31 and the second focal length shortening structure 32.

The aforementioned descriptions merely represent the preferred embodiments of the instant disclosure, without any intention to limit the scope of the instant disclosure which is fully described only within the following claims. Various equivalent changes, alterations or modifications based on the claims of the instant disclosure are all, consequently, viewed as being embraced by the scope of the instant disclosure.

What is claimed is:

1. A lens focusing device, comprising:
   a lens holding module in which at least one test lens is disposed;
   a replaceable chart display module including a frame structure, a first chart display element detachably disposed on the frame structure, and a plurality of second chart display elements detachably disposed on the frame structure, wherein each second chart display element is inclined at a predetermined angle relative to the first chart display element; and
   a focal length shortening module including a first focal length shortening structure and a plurality of second focal length shortening structures, wherein the first focal length shortening structure is disposed between the at least one test lens and the first chart display element, and each second focal length shortening structure is disposed between the at least one test lens and the corresponding second chart display element.

2. The lens focusing device of claim 1, wherein the frame structure includes a first frame and a plurality of second frames fixedly or adjustably disposed on the first frame.

3. The lens focusing device of claim 2, wherein the first frame includes a first frame body and a plurality of first clamping elements disposed on the first frame body, and each second frame includes a second frame body fixedly or adjustably disposed on the first frame body and a plurality of second clamping elements disposed on the second frame body.

4. The lens focusing device of claim 3, wherein the first frame body has a plurality of lateral side portions, the second frame bodies respectively fixedly or adjustably disposed on the lateral side portions of the first frame body, and each second frame body is inclined at a predetermined angle relative to the first frame body.

5. The lens focusing device of claim 3, wherein the first chart display element is positioned on the first frame body by clamping of the first clamping elements of the first frame, and each second chart display element is positioned on the corresponding second frame body by clamping of the second clamping elements of the corresponding second frame.

6. The lens focusing device of claim 3, wherein each second frame body includes at least two extending arms fixedly or adjustably disposed on the first frame body, and each second chart display element is positioned between the at least two extending arms of the corresponding second frame body by clamping of the second clamping elements of the corresponding second frame.

7. The lens focusing device of claim 3, wherein the first clamping element has a first fixing portion fixed on the first frame body, a first position limiting portion extended from the first fixing portion to limit the position of the first chart display element, and a first pressing portion connected to the first position limiting portion to abut against the first chart display element, and the second clamping element has a second fixing portion fixed on the second frame body, a second position limiting portion extended from the second fixing portion to limit the position of the second chart display element, and a second pressing portion connected to the second position limiting portion to abut against the second chart display element.

8. The lens focusing device of claim 1, wherein the first focal length shortening structure includes at least one telephoto lens, and a first chart image generated by the first chart display element sequentially passes through the at least one telephoto lens and the at least one test lens to form a first image light beam that is projected onto an image sensing element.

9. The lens focusing device of claim 1, wherein each second focal length shortening structure includes at least two reflecting mirrors, and a second chart image generated by the second chart display element is sequentially reflected by the at least two reflecting mirrors in advance and then passes through the at least one test lens to form a second image light beam that is projected onto an image sensing element.

10. The lens focusing device of claim 1, wherein the first focal length shortening structure is disposed on the lens holding module, so that both the at least one test lens and the first focal length shortening structure are clamped on the lens holding module.

11. The lens focusing device of claim 10, wherein the first focal length shortening structure includes at least one telephoto lens that is swung following the at least one test lens for scanning the first chart display element and the second chart display elements.

12. A replaceable chart display module, comprising:
a frame structure including a first frame and a plurality of second frames fixedly or adjustably disposed on the first frame, wherein the first frame includes a first frame body and a plurality of first clamping elements disposed on the first frame body, and each second frame includes a second frame body fixedly or adjustably disposed on the first frame body and a plurality of second clamping elements disposed on the second frame body;
a first chart display element detachably disposed on the frame structure; and
a plurality of second chart display elements detachably disposed on the frame structure, wherein each second chart display element is inclined at a predetermined angle relative to the first chart display element.

13. The replaceable chart display module of claim 12, wherein the first frame body has a plurality of lateral side portions, the second frame bodies respectively fixedly or adjustably disposed on the lateral side portions of the first frame body, and each second frame body is inclined at a predetermined angle relative to the first frame body.

14. The replaceable chart display module of claim 12, wherein the first chart display element is positioned on the first frame body by clamping of the first clamping elements of the first frame, and each second chart display element is positioned on the corresponding second frame body by clamping of the second clamping elements of the corresponding second frame.

15. The replaceable chart display module of claim 12, wherein each second frame body includes at least two extending arms fixedly or adjustably disposed on the first frame body, and each second chart display element is positioned between the at least two extending arms of the corresponding second frame body by clamping of the second clamping elements of the corresponding second frame.

16. The replaceable chart display module of claim 12, wherein the first clamping element has a first fixing portion fixed on the first frame body, a first position limiting portion extended from the first fixing portion to limit the position of the first chart display element, and a first pressing portion connected to the first position limiting portion to abut against the first chart display element, and the second clamping element has a second fixing portion fixed on the second frame body, a second position limiting portion extended from the second fixing portion to limit the position of the second chart display element, and a second pressing portion connected to the second position limiting portion to abut against the second chart display element.

* * * * *